United States Patent
Onaga et al.

[19]

[11] Patent Number: 5,818,568
[45] Date of Patent: Oct. 6, 1998

[54] EYEGLASS FRAME ASSEMBLY HAVING SCREW-LESS HINGES

[75] Inventors: Mikio Onaga; Chikao Uchida; Yoshikazu Takahashi, all of Fukui-ken, Japan

[73] Assignees: Eye-Protor Kobayashi Inc.; Kabushiki Kaisha Onaga Megane, both of Fukui-ken, Japan

[21] Appl. No.: 852,414

[22] Filed: May 7, 1997

[51] Int. Cl.⁶ ...................................................... G02C 5/22
[52] U.S. Cl. ................................ 351/153; 351/89; 16/228
[58] Field of Search .................................... 351/111, 113, 351/119, 116, 121, 106, 153, 89; 16/228

[56] References Cited

U.S. PATENT DOCUMENTS 5,135,296   8/1992   Linberg et al. ........................... 351/106

*Primary Examiner*—Huy Mai

*Attorney, Agent, or Firm*—Nikaido, Marmelstein, Murray & Oram LLP

[57] ABSTRACT

Disclosed is an improved eyeglass frame assembly having screw-less hinges. It comprises a front comprising two rims each embracing a lens "L" and a bridge connecting these rims "R" by their inner sides; and a pair of temples "T" each rotatably connected to the outer side of each rim. Each rim "R" is an open-loop metal wire having two holding projections 1, 1 formed at its opposite open ends. Each temple "T" has an arc-like hook 31 formed at its end, and the hook 31 has a vertical stopper 32 formed at its end. The frame assembly further comprises two holder pieces 2, 2, each having two holes 21, 21 to accomodate the two parallel holding projections 1, 1. The arc-like hook 31 embraces each holder piece 2, permitting the temple "T" to rotate about the holder piece 2 until the vertical stopper 32 abuts against the portions of the holding projections 1, 1 projecting from the holder piece 2. The screw-less, rim rock-and-temple hinge structure facilitates the assembling and disassembling of eyeglasses, giving a neat shape to the eyeglasses.

6 Claims, 3 Drawing Sheets

EYEGLASS FRAME ASSEMBLY HAVING SCREW-LESS HINGES

BACKGROUND OF THE INVENTION

1. Field of the Invention

The present invention relates generally to an eyeglass frame assembly, and particularly to an eyeglass frame assembly which is easy to be assembled, and is simple in structure and neat in appearance. Usually such an eyeglass frame assembly has rim lock-and-temple hinge means integrally formed therein.

2. Description of Related Art

There has been an increasing demand for light eyeglass frames, not permitting their rims to cause any hindrance to the sight, expanding the field of sight, still assuring that comfortable feeling is given to persons wearing such eyeglasses. Thus, the rim and temple of the frames has been reduced toward a possible minimum thinness. As a matter of fact, however, there is a certain limit to reduction in slimming the frame structure. Specifically as the rim and temple is reduced in size, associated rim-locking pieces and hinges need to be reduced in size because otherwise, they would give an awkward appearance to the eyeglasses, but such parts are very difficult to reduce their sizes; their sizes have reached to practically possible minimum.

As is well known, a conventional rim locking part uses very small-sized screws to close and fix the opposite ends of the open-loop rim. Also, a conventional hinge uses a screw as a pivot. Therefore, reduction of rim locking parts and hinges cannot be attained without reducing the size of associated screws. Such screws, however, are reduced to practically possible minimum, and further reduction would be next to impossible. Also, disadvantageously use of such minimum screws makes it difficult to assemble associated parts, thus not facilitating the changing of lenses. Still disadvantageously such minimum screws are liable to loosen. Further reduction of such parts even if possible, would be undesirable from these points of view.

SUMMARY OF THE INVENTION

In view of the above one object of the present invention is to provide an eyeglass frame assembly having screw-less hinges, more particularly screw-less, rim lock-and-temple hinge units, thereby providing a pleasing neat appearance for the eyeglasses.

To attain this object an eyeglass frame assembly having screw-less hinges comprising a front comprising two rims each embracing a lens and a bridge connecting these rims by their inner sides; and a pair of temples each rotatably connected to the outer side of each rim, is improved according to the present invention in that: each of said rims is an open-loop metal wire having two parallel holding projections formed at its opposite open ends; each of said temples has a major arc-like hook formed at its end, said hook having a vertical stopper at its end; and said eyeglass frame assembly includes two holder pieces, each having two holes to accomodate said two parallel holding projections, allowing said major arc-like hook to embrace each holder piece, thereby permitting said temples to rotate about said holder pieces until said holding projections abut against the vertical stoppers of the major arc-like hooks.

The present invention can be applied to suspender-type eyeglasses which has a pair of lenses suspended by strings such as nylon threads. Specifically, each rim comprises an upper rim half of metal wire and a lower rim half, which is in the form of string for suspending the lens from the upper rim half. The upper rim half has a holding projection formed at its outer end, and the suspending string has a holding projection bound to its outer end. Each temple has a major arc-like hook formed at its end, and the hook has a vertical stopper integrally connected to its end. The frame assembly includes two holder pieces, each having two holes to accomodate the holding projections of the upper and lower rim halves, allowing the major arc-like hook to embrace each holder piece, thereby permitting the temples to rotate about the holder pieces until the holding projections abut against the vertical stoppers of the major arc-like hooks.

Each holder piece may have an annular groove made on its circumference for permitting the major arc-like hook to be press-fitted therein.

The holder pieces may be made of a synthetic resin material, and two parallel holding projections may be detachably inserted into the holes of each holder piece.

Other objects and advantages of the present invention will be understood from the following description of eyeglass frame assembly according to preferred embodiments of the present invention, which are shown in accompanying drawings.

DESCRIPTION OF THE PREFERRED EMBODIMENTS

The first, second and third embodiments of the present invention are described below with reference to these drawings.

Figure 7:
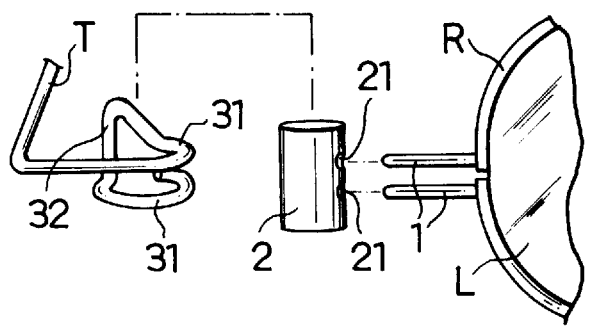
FIG. 7 is an exploded, perspective view of a rim lock-and-temple hinge means according to a second embodiment of the present invention.
Figure 8:
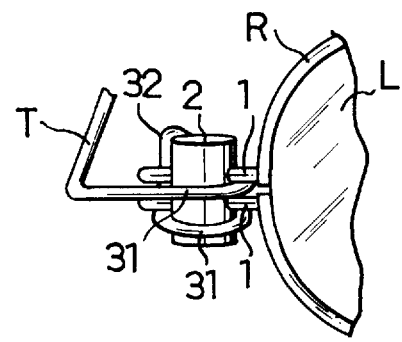
FIG. 8 is a perspective view of the rim lock-and-temple hinge means.
Figure 9:
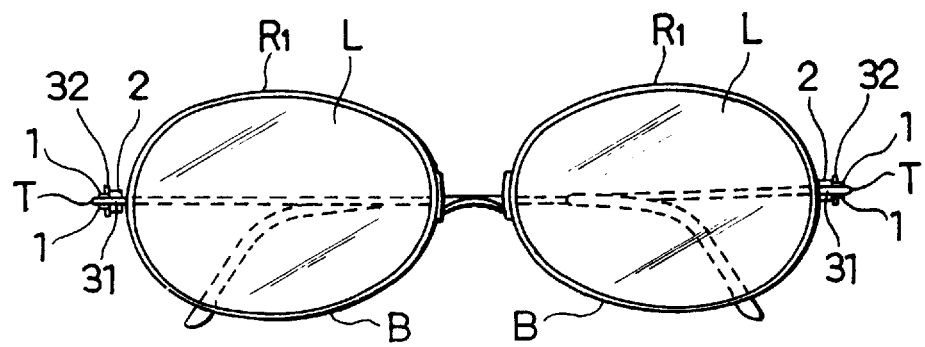
FIG. 9 is a front view of a suspender-type eyeglasses whose frame assembly uses rim lock-and-temple hinge means according to a third embodiment of the present invention.
Figure 10:
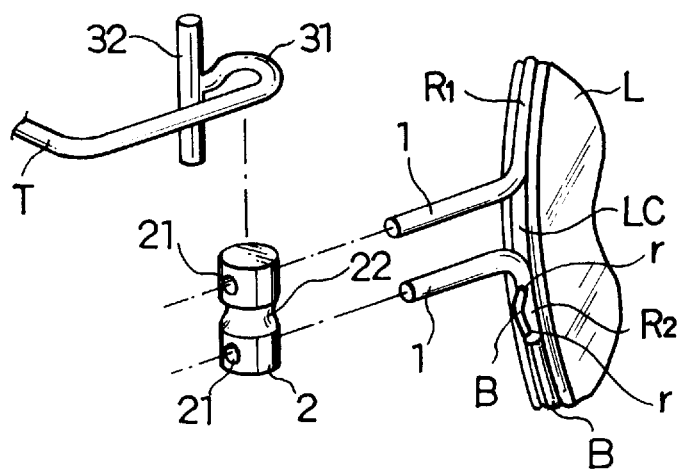
FIG. 10 is an exploded, perspective view of the rim lock-and-temple hinge means.
Figure 11:
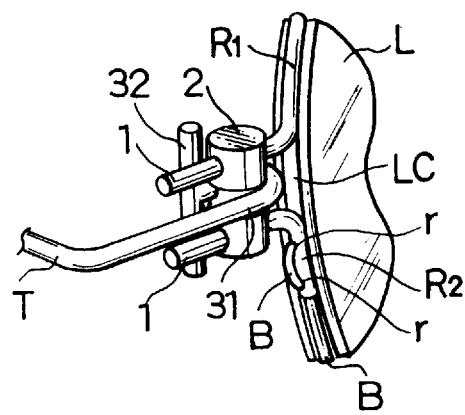
FIG. 11 is a perspective view of the rim lock-and-temple hinge means.

FIGS. 1 to 6 show the first embodiment of the present invention;

FIGS. 7 and 8 show the second embodiment; and FIGS. 9 to 11 show the third embodiment.

Figure 1:
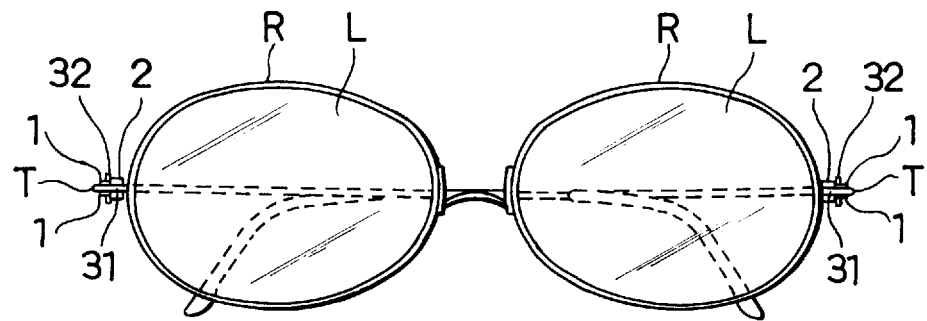
FIG. 1 is a front view of an eyeglasses whose frame assembly has screw-less, rim lock-and-temple hinge means according to a first embodiment of the present invention.

Eyeglass Frame Assembly having Screw-less, Rim Lock-and-Temple Hinge Means according to the First Embodiment:

Referring to FIG. 1, it comprises a front comprising two rims "R" each embracing a lens "L" and a bridge connecting these rims "R" by their inner sides; and a pair of temples "T" each rotatably connected to the outer side of each rim "R". As best seen from FIG. 2, each lens "L" has a groove "LC" made its circumference. A round metal wire is bent into an open loop shape to be in conformity with the lens shape, and the opposite ends of the open loop hole are bent to form two parallel straight ends 1, 1. Each lens "L" has the open-loop wire press-fitted in its circumferential groove "LC", allowing the parallel straight ends 1, 1 to extend outward. These parallel straight ends 1, 1 can be used as holding projections.

A holder piece 2 is a cylindrical body of polyurethane. It has upper and lower through holes 21, 21 and an annular groove 22 between these through holes 21, 21. These two holes 21, 21 are same distance apart from each other as the space between the parallel holding projections 1, 1, thus permitting the holding projections 1, 1 to be inserted into the holes 21, 21 of the holder piece 2. The annular groove 22 permits the hook 31 of the temple "T" to rotatably fit on the holder piece 2, as described below.

Figure 2:
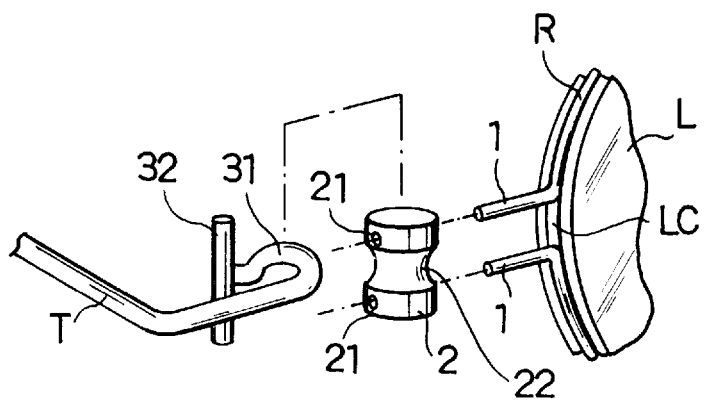
FIG. 2 is an exploded, perspective view of the rim lock-and-temple hinge means.
Figure 3:
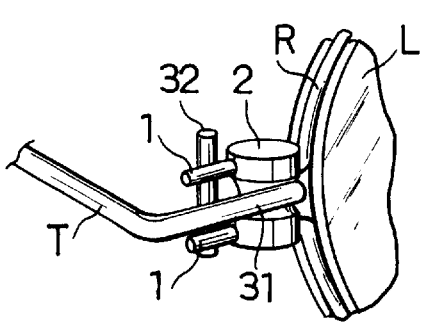
FIG. 3 is a perspective view of the rim lock-and-temple hinge means.

As seen from FIGS. 2 and 3, each temple "T" has a major arc-like hook 31 formed at its end. The hook 31 has a vertical stopper 32 soldered thereto in the form of laid "T".

In assembling, first the holder piece 2 is combined with each temple "T" by press-fitting its major arc-like hook 31 in the annular groove 22 of the holder piece 2 to embrace the same. Then, the front is combined with each temple "T" by inserting the holding projections 1, 1 into the through holes 21, 21 until their ends appear at the opposite side. Some details are as follows.

First, the major arc-like hook 31 of the temple "T" is detachably press-fitted in the annular groove 22 of the holder piece 2, thereby permitting the holder piece 2 to function as the pivot of the hinge. The major arc-like hook 31 has a diameter somewhat shorter than the diameter of the annular groove 22, thereby causing a significant resistance to the opening and closing of the temple "T" relative to the front, which significant resistance is caused by the bending elasticity of the hook 31 and the friction between the polyurethane cylinder 2 and the temple wire.

Then, the open-loop rim "R" is press-fitted in the circumferential groove "LC" of each lens "L", and the holding projections 1, 1 are detachably attached to the holder piece 2 by inserting them in the through holes 21, 21 of the holder piece 2 until their ends come out of the opposite side. Thus, the lens "L" can be positively held by the rim "R", which is fastened with lock. Each through hole 21 has a diameter somewhat shorter than the diameter of the holding projection 1, thereby positively gripping the holding projection 1 by the elasticity of the polyurethane cylinder 2 and the friction between the polyurethane cylinder 2 and the holding projection 1, as described above.

Figure 4:
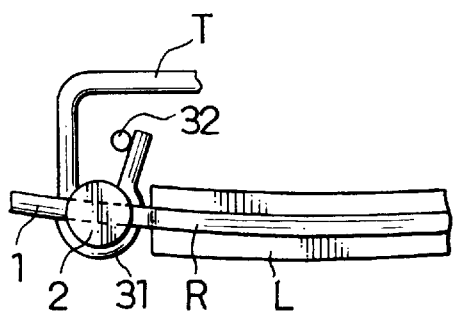
FIG. 4 is a plane view of the rim lock-and-temple hinge means in the temple-folding position.
Figure 5:
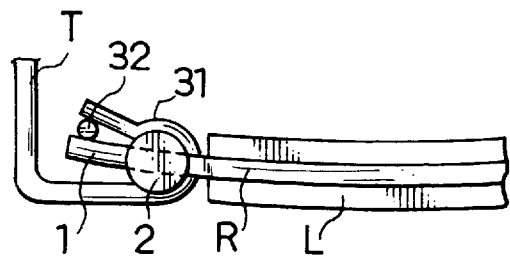
FIG. 5 is a similar plane view of the rim lock-and-temple hinge means in the temple-opening position, in which the temple is opened perpendicular to the front of the frame.

As seen from FIGS. 3 to 5, the holder piece 2 along with the holding projections 1, 1 lock the rim "R", and at the same time, the temple "T" is hinged to the rim "R", allowing the holder piece 2 to function as a pivot, about which the temple "T" can rotate. As seen from FIG. 5, the opening of the temple "T" is prevented by the stopper 32 when the temple "T" reaches a predetermined opening angle.

Figure 6:
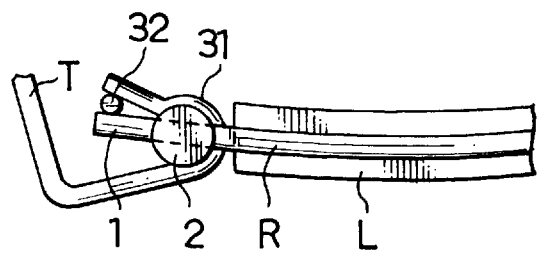
FIG. 6 is a similar plane view of the rim lock-and-temple hinge means, showing that the temple is opened beyond the normal temple-opening position.

As seen from FIG. 6, the excessive opening of the temple "T" is prevented by the resilient resistance to further opening beyond a certain angular limit, which resilient resistance is caused as a counter force to the forcedly expanding and deforming of the major arc hook shape after the stopper 32 abuts against the holding projections 1, 1. Even if undesired external force is applied to the temple "T" to make it to open wide beyond the certain limit, such undesired external force can be absorbed by the major arc-like hook 31, thereby preventing the concentration of such undesired external force on the rim "R". Thus, the deformation of the rim "R" and hence the breaking of the lens caused thereby can be avoided.

In this particular embodiment the holder piece 2 has an annular groove 22 made on its circumference for guiding rotation of the major arc-like hook 31, but this annular groove 22 can be omitted. Specifically as seen from FIG. 3, the major arc-like hook 31 is between the parallel holding projections 1, 1, thereby preventing the major arc-like hook 31 from being displaced vertically. Whether such annular groove 22 is made or not in the holder piece 2 depends on how large the space is available between the parallel holding projections 1, 1 or upper and lower through holes 21, 21.

In this particular embodiment the annular groove 22 is circular, but it can take any other shape in cross section. For instance, it can be polygonal, and then, the hook 31 can be polygonal to be in conformity with the polygonal shape of the groove. Then, the temple "T" can rotate step by step about the pivot of holder piece 2, clicking and making a stable stop for each step.

As may be understood from the above, the screw-less locking-and-hinging structure according to the first embodiment permits the locking of the rim "R" embracing the lens "L" and the hinging of the temple "T" to the rim "R" simply by press-fitting the hook on the holder piece, and by inserting the parallel holding projections into the through holes of the holder piece. No screws are required in rim locks and hinges, and therefore, the assembling work is much easier than conventional frames, and the manufacturing cost can be substantially reduced.

The disassembling and removing of the lenses from the frame is easy, too. As seen from FIG. 6, it suffices that the temple "T" is made to open wider beyond the opening limit, which is defined by abutment of the stopper against the parallel holding projections 1, thereby making the hook-to-temple transition part to depart far apart from the stopper 32, thereby releasing the holder piece 2 from the embracing by the hook 31. Thus, the changing of the lens can be effected with ease.

The rim lock and the hinge are combined by the holder piece 2. This contributes to the simplifying and sliming of the eyeglass frames, and to the neat-designing thereof.

Eyeglass Frame Assembly having Screw-less, Rim Lock-and-Temple Hinge Means according to the Second Embodiment:

Referring to FIGS. 7 and 8, each rim "R" has a "V"-shaped groove made inside, and two parallel holding projections 1, 1 are formed in the vicinities of the opposite open ends of the rim "R". These holding projections 1, 1 can be formed to be somewhat oblique to the front plane in which the rim "R" embraces the lens "L" rather than coplanar with the front plane as in the first embodiment. The direction in which the holding projections extend from the loop hole of the rim "R" can be determined in consideration of an angle which the holding projections form with respect to the front plane or of the position in which the stopper 32 is formed.

The hook 31 is formed by bending a given terminal length of temple wire as in the first embodiment, but the hook shape is different from that of the first embodiment. Specifically the hook comprises upper and lower arc-sections 31 integrally connected by a vertical stopper 32.

As seen from FIG. 8, the hook is detachably attached to the holder piece 2 by permitting the upper arc-section 31 to wind around the holder piece 2 between its upper and lower through holes 21, 21 and by permitting the lower arc-section 31 to wind around the holder piece 2 below its lower through hole 21. Thus, the temple "T" can be rotatably fixed to the holder piece 2, using the holder piece 2 as a pivot. The opposite open ends of the loop hole can be locked to positively embrace the lens "L" simply by inserting the holding projections 1, 1 into the upper and lower through holes 21, 21 of the holder piece 2.

In this particular embodiment the holder piece 2 has no annular groove; the upper and lower arc-sections 31 are interlaced with the upper and lower holding projections 1, 1, thereby preventing vertical deviation of the hook 31 on the holder piece 2. The double winding of the hook around the holder piece has the effect of providing a good friction therebetween and hence a comfortable resistance to the opening of the temple "T" relative to the front.

Eyeglass Frame Assembly having Screw-less, Rim Lock-and-Temple Hinge Means according to the Third Embodiment:

FIGS. 9 to 11 show a suspender-type of eyeglasses having two lenses "L" suspended by nylon strings. It is equipped with screw-less rim lock-and-temple hinge means according to the third embodiment of the present invention. Specifically each rim comprises an upper rim half "$R_1$" of metal wire and a lower rim half "$R_2$", which is in the form of string "B" for suspending the lens "L". Each lens "L" has a groove "LC" made on its circumference, and the wire and string rim-halves are fitted in the circumferential groove "LC" of the lens "L". The upper rim half "$R_1$" has a holding projection 1 formed at its outer end by bending a given terminal length of rim wire at a right angle whereas the lower rim half "$R_2$" has an "L"-shaped holding projection 1 connected to the end of the string suspender "B". Specifically the "L"-shaped holding projection 1 has very small holes "r" made on one leg thereof, and the end of the string suspender "B" is threaded in the very small holes "r" of the "L"-shaped holding projection 1 for binding thereto.

As seen from FIG. 11, the hook 31 of the temple "T" is press-fitted in the annular groove 22 of the holder piece 2 between the upper and lower holding projections 1, 1, thereby permitting the temple "T" to rotate about the holder piece 2, which functions as a pivot. The lens "L" can be positively held by inserting the upper and lower holding projections 1, 1 into the upper and lower through holes 21, 21 of the holder piece 2, thereby tightly stretching the wire and nylon string rim halves around the lens "L".

As may be understood from the above, a screw-less rim lock-and-temple hinge means according to the present invention can positively hold the lens simply by press-fitting the laid "T"-shaped, hook-like end of the temple on an associated holder piece and by inserting the holding projections in the through holes of the holder piece, thereby simultaneously locking the loop hole of the rim and hinging the temple to the rim without using any screws. The assembling of eyeglasses is easy and quick, and the manufacturing cost is low, compared with a conventional eyeglasses. Also, advantageously use of the screwless rim lock-and-temple hinge means permits the neat designing of eyeglasses.

What is claimed is:

1. An eyeglass frame assembly having screw-less hinges comprising: a front having two rims each embracing a lens and a bridge connecting said rims by the inner sides of said rims; and a pair of temples each rotatably connected to the outer side of each rim, wherein each of said rims is an open-loop metal wire having two parallel holding projections formed at the opposite open ends of said open-loop metal wire; each of said temples has a major arc-like hook formed at one temple end, said hook having a vertical stopper integrally connected thereto; and said eyeglass frame assembly includes two holder pieces, each having two holes to accommodate said two parallel holding projections, allowing said major arc-like hook to embrace each holder piece, thereby permitting each of said temples to rotate about the holder piece until the vertical stopper of the major arc-like hook abut against the portions of the holding projections projecting from the holder piece.

2. An eyeglass frame assembly having screw-less hinges according to claim 1, wherein each of said holder pieces has an annular groove made on the circumference of said holder piece for permitting the major arc-like hooks to fit therein.

3. An eyeglass frame assembly having screw-less hinges according to either one of claims 1 or 2, wherein said holder pieces are of a synthetic resin material, said holding projections being detachably inserted into the holes of each of said holder pieces.

4. An eyeglass frame assembly having screw-less hinges comprising: a front having two rims each embracing a lens and a bridge connecting said rims by the inner sides of said rims; and a pair of temples each rotatably connected to the outer side of each rim, wherein each of said rims comprises an upper rim half of metal wire and a lower rim half, which is in the form of string for suspending the lens from the upper rim half, said upper rim half having a holding projection formed at the outer end of said upper rim half, said lower rim half having an another holding projection connected to the outer end of said lower half rim; each of said temples has a major arc-like hook formed at one temple end, said hook having a vertical stopper integrally connected to the end of said hook; and said eyeglass frame assembly includes two holder pieces, each having two holes to accommodate said holding projections, allowing said major arc-like hook to embrace each holder piece, thereby permitting each of said temples to rotate about the holder piece until the vertical stopper of the major arc-like hook abut against the portions of the holding projections projecting from the holder piece.

5. An eyeglass frame assembly having screw-less hinges according to claim 4, wherein each of said holder pieces has an annular groove made on the circumference of said holder piece for permitting the major arc-like hooks to fit therein.

6. An eyeglass frame assembly having screw-less hinges according to either one of claims 4 or 5, wherein said holder pieces are of a synthetic resin material, said holding projections being detachably inserted into the holes of each of said holder pieces.

* * * * *